Dec. 23, 1958 H. BORKAN ET AL 2,865,985

COLOR TELEVISION TRANSMITTER

Filed March 14, 1955 3 Sheets-Sheet 1

INVENTORS
HAROLD BORKAN
& PAUL K. WEIMER
BY
[signature]
ATTORNEY

Dec. 23, 1958 H. BORKAN ET AL 2,865,985

COLOR TELEVISION TRANSMITTER

Filed March 14, 1955 3 Sheets-Sheet 2

INVENTORS
HAROLD BORKAN
& PAUL K. WEIMER
BY
ATTORNEY

INVENTORS
HAROLD BORKAN
& PAUL K. WEIMER
BY [signature]
ATTORNEY

United States Patent Office 2,865,985

Patented Dec. 23, 1958

2,865,985

COLOR TELEVISION TRANSMITTER

Harold Borkan, New Brunswick, and Paul K. Weimer, Princeton, N. J., assignors to Radio Corporation of America, a corporation of Delaware Application March 14, 1955, Serial No. 494,114

The terminal fifteen years of the term of the patent to be granted has been disclaimed 10 Claims. (Cl. 178—5.4)

Figure 1:
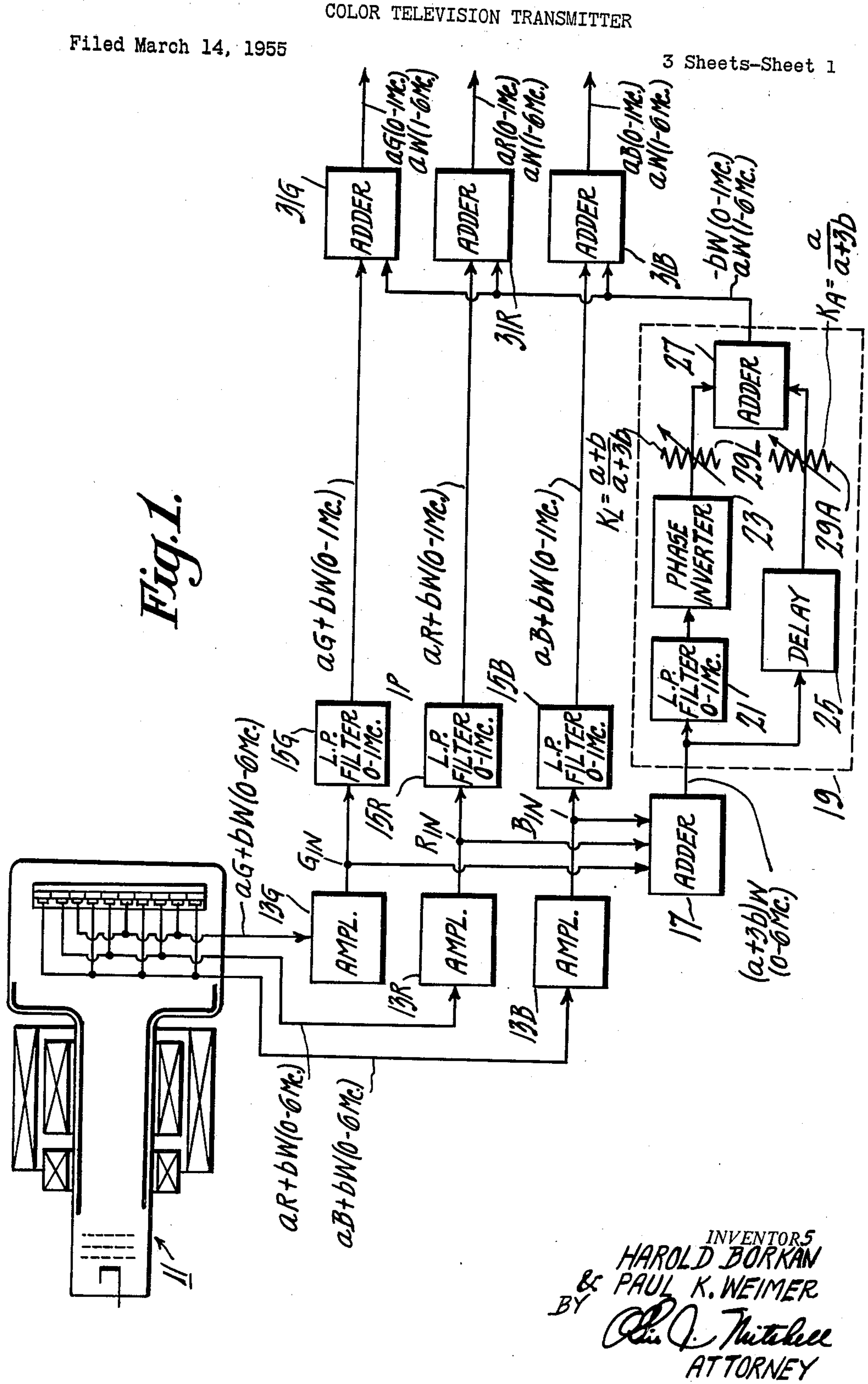

This invention relates to color television and particularly, to signal processing apparatus for color television pickup systems of the type employing a single camera tube to simultaneously produce a plurality of component color signals.

Simultaneous color television cameras of the single pickup tube type have been proposed utilizing a series of different optical filter strips in a recurring sequence to break down the light from a subject image into its color components as imaged upon the pickup tube target. In one contemplated form of such simultaneous color camera tubes, a target structure is provided comprising a glass base; a plurality of red, green and blue optical filter strips deposited thereon and interleaved in a predetermined sequence; a plurality of optically transparent, electrically conductive strips laid down on the filter strips such that each conductive strip is super imposed upon a respectively different one of the filter strips; a continuous layer of photoconductive material, such as porous antimony sulphide, over-laying the conductive strips, and respective red, blue and green signal output leads or bus bars connected to the appropriate ones of said conductive strips. As such a target is scanned by a cathode ray beam each output lead is supplied with its component color signal from the signal strips associated therewith in response to the discharge of those portions of the photoconductor which received an image representative charge from light from the respective component color passing through the optical filter strips associated therewith. In another contemplated form, a variant of such target structure is provided wherein the optical filter strips are of the so-called Fabry-Perot type, superimposed signal strips and not being required since such filter strips may themselves be used as the target signal strips.

A problem that may arise in the use of these color pickup tubes, which shall be referred to generally as tri-color pickup tubes is that the three output color signals may not represent saturated hues as desired, but may rather be diluted with white information. An obvious source for such dilution where the Fabry-Perot type filters are employed is the passage of unfiltered light from the image through the spaces left between adjacent filter strips, such spacing being required so as not to "short" the signal strips together and to reduce capacitive coupling between the strips. In accordance with the principles of the present invention, the undesired dilution of the output color signals of a tri-color pickup tube are "computed out" to achieve properly selective output signals.

In utilization of the well-known mixed highs principle, apparatus for processing the output signal of a tri-color pickup tube have been proposed wherein the respective output color signals of the pickup tube are combined in an adder and passed through a high pass filter to obtain a mixed highs signal, which may be added back to the low frequency components of each component color signal, as selected by respective low pass filters, to provide the respective component color signals plus mixed highs signals for use as desired in the respective component color signal channels of a color television system.

In accordance with an embodiment of the present invention, the high pass filter of the mixed highs signal forming apparatus is of the type provided with an all-pass path and a low pass path, the latter including an inverting stage, and means for combining the phase inverted output of the low pass path with signals from the all-pass path.

In particular accordance with an embodiment of the present invention, means are provided for setting the gains of the respective signal paths in the high pass filter at predetermined values expressible in terms of the dilution present in the color information being processed, to obtain an output signal which when added back to the low frequency components of the generated color signal will not only supply the desired mixed highs signal component thereto but will also effectively cancel out the diluting "white" signal component appearing in each color signal channel. It has been determined that expressions for the requisite gain settings of the low pass and all pass paths may be generalized as $$\frac{a+b}{a+3b}$$

for the low pass path and $$\frac{a}{a+3b}$$

for the all pass path, where the respective color signals subject to processing in accordance with the invention may be expressed as $aG+bW$, $aR+bW$ and $aB+bW$; G, R and B representing the desired component color information, and W representing the diluting "white" information, and equal to $G+R+B$.

It may be appreciated that in application of the principles of the invention as embodied above, the output of the "high pass filter" will include not only the desired mixed highs signal to be supplied to each color signal channel, but also a "mixed lows" signal of phase and amplitude such as to effectively cancel the diluting white signal appearing in each component color signal channel. The invention thus provides relatively simple yet accurate apparatus and procedures for substantially eliminating undesired dilution of component color signals.

It is thus an object of the present invention to provide novel and improved signal processing apparatus for use in a simultaneous color television system.

It is also an object of the present invention to provide novel and improved simultaneous color television pickup systems.

It is a further object of the present invention to provide means for substantially eliminating undesired dilutions of the component color signal outputs of a simultaneous color pickup tube.

It is an additional object of the present invention to provide novel and improved means for improving the effective saturation of the hues represented by the component color signal outputs of a color pickup tube of the type employing a plurality of interleaved signal strips.

Figure 2A:
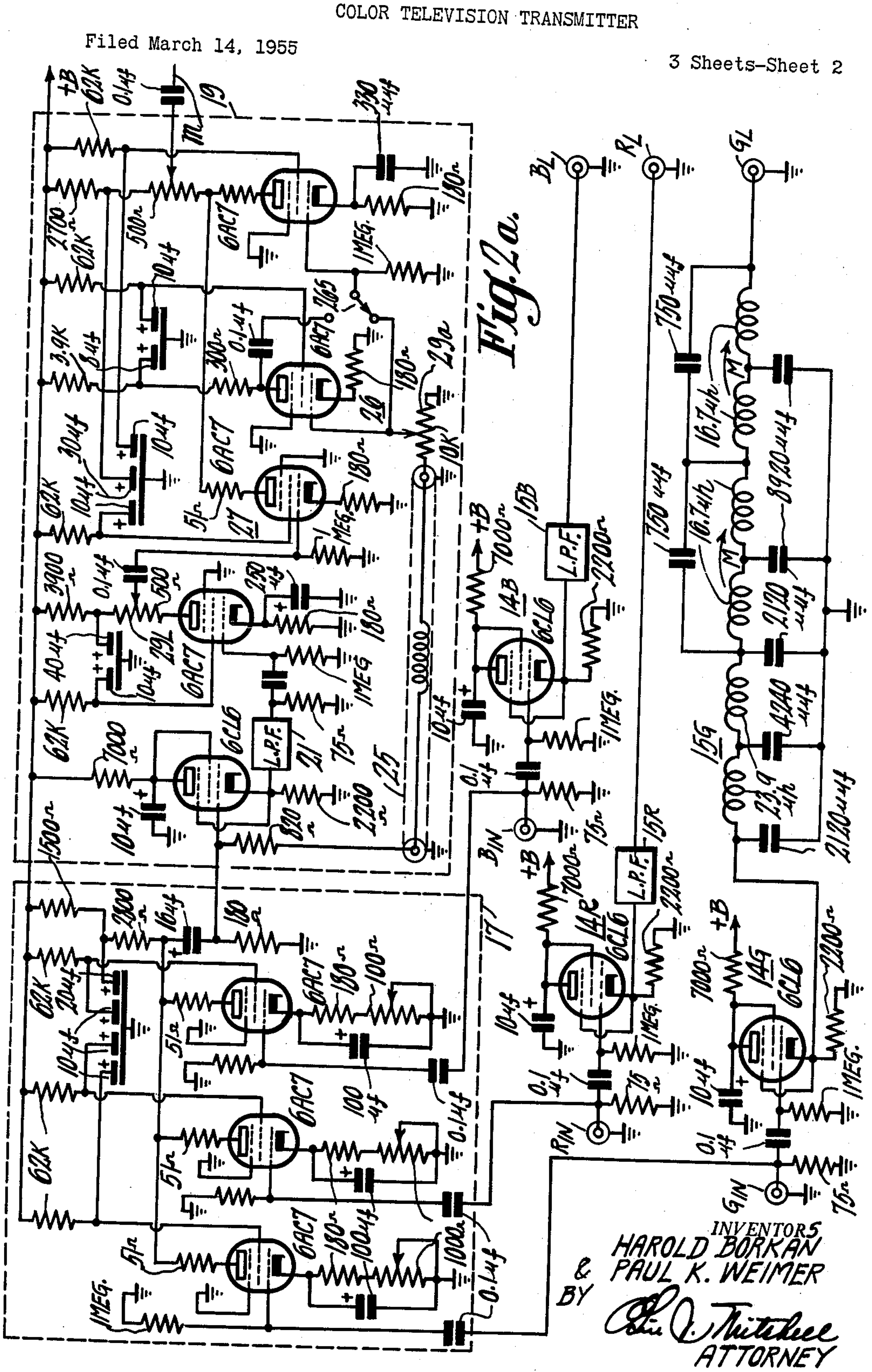
Figure 2B:
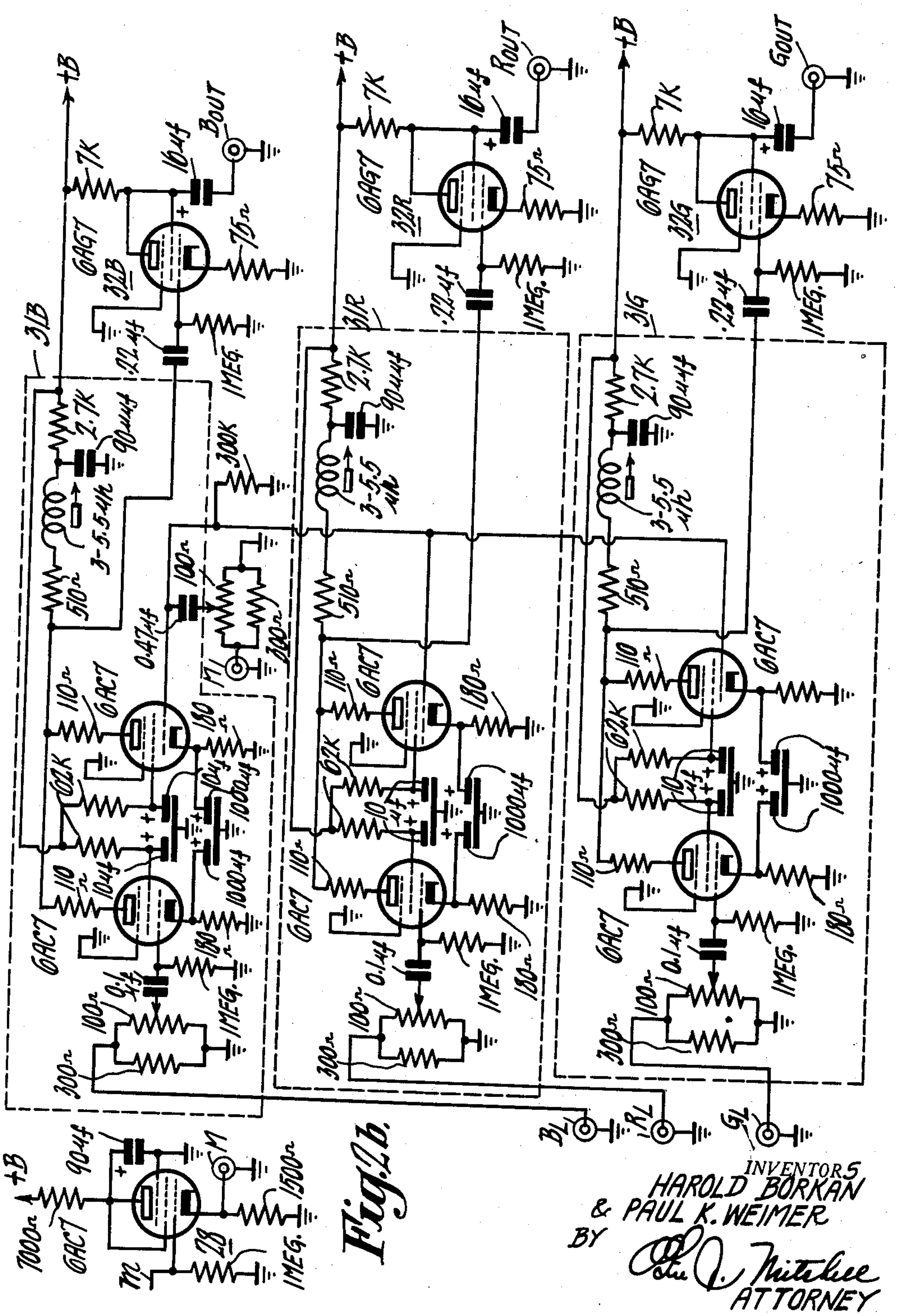

Other objects and advantages of the present invention may be ascertained by those skilled in the art upon a reading of the following detailed description and an inspection of the accompanyng drawing in which:

Figure 1 illustrates in block and schematic form a color television pickup system including signal processing apparatus in accordance with an embodiment of the present invention;

Figures 2*a* and 2*b* jointly illustrate the signal processing apparatus of Figure 1 in greater schematic detail.

Referring more particularly to Figure 1, a source 11 of a plurality of simultaneous color signals is illustrated as being a tri-color pickup tube of the general strip target type previously described. Reference may be made to the co-pending application of Paul K. Weimer, Ser. No. 344,497, filed March 25, 1953, and entitled "Cathode Ray Tube and Target" for a more detailed disclosure of a tri-color pickup tube of this type. It may be assumed that the pickup tube 11 has associated therewith the usual components, such as a deflection yoke, beam focusing means, operating potential supply for the pickup tube electrodes, etc. whereby the tube 11 may operate in accordance with the principles set forth previously to produce a plurality of output signals representative of respectively different color aspects of a scanned image. It shall also be assumed, for purposes of example, that the color signals desired for utilization are signals representative of green, red and blue component colors (G, R and B).

For various reasons, which will be discussed in greater detail subsequently, the respective output signals of the pickup tube 11 may not constitute the desired component color signals in undiluted form, but rather each may include "white" information in addition to the respective component color information. Assuming that the white dilution of each of the respective pickup tube output signals is to substantially the same degree, which is a reasonable assumption where the pickup tube target structure is substantially symmetrical, the respective output signals may thus be expressed in terms of the desired component color signals G, R and B and the diluting white signal W, as follows: $aG+bW$, $aR+bW$, and $aB+bW$. The bandwidth of the respective output signals may be assumed to be 0–6 mc., for purposes of example. The respective output signals of the pickup tube 11, of the character indicated, are applied to respective amplifiers 13G, 13R and 13B. The respective amplifier outputs are applied to the input terminals $G_{IN}$, $R_{IN}$ and $B_{IN}$ of signal processing apparatus which embodies the principles of the present invention.

The mixed highs principle is now well known in the color television art. In recognition and utilization of the mixed highs principle, the standard color television system does not require separated component color information over the full video bandwidth utilized. It has been found that satisfactory reproduction of a colored image may be obtained where separated component color information is provided over only a low frequency portion of the video band utilized, black and white information being adequate over the remaining high frequency portion of the band for the fine detail rendition. The signal processing apparatus of the present invention operates upon the color information supplied to it, in a manner compatible with such use of the mixed highs principle, to provide respective output signals which comprise a low frequency portion (e. g. 0–1 mc.) of signal information concerning a respective component color (G, R or B), and a high frequency portion (e. g. 1–6 mc.) of black and white signal information (W). In the process of forming output signals of this useful character, the processing apparatus, in accordance with the principles of the present invention, removes substantially all the diluting W signal in the low frequency range where separation of color signals is desired.

The processing apparatus illustrated in Figure 1 includes respective low pass filters 15G, 15R and 15B, having the illustrative 0 to 1 mc. color signal passband and coupled to the appropriate input terminal $G_{IN}$, $R_{IN}$ and $B_{IN}$ respectively. It will be appreciated that the outputs of the respective low pass filters again comprise signals of the character $aG+bW$, $aR+bW$ and $aB+bW$, restricted, however, to the 0 to 1 mc. color signal band. Also coupled to the input terminals $G_{IN}$, $R_{IN}$ and $B_{IN}$ is an adder 17, which serves to combine substantially linearly the respective wide band signals $aG+bW$, $aR+bW$, and $aB+bW$ to provide a single wide band output signal of the character $(a+3b)W$. This signal is applied to the input of a high pass filter 19 of the type comprising parallel low pass and all pass paths. The low pass path to which the signal $(a+3b)W$ is applied is illustrated as comprising a low pass filter 21 and a phase or polarity inverter 23. The all pass path to which the signal $(a+3b)W$ is also applied is illustrated as comprising delay means 25, which may, for example, be a delay line of well known type, having an electrical length such as to match the delay imparted to the $(a+3b)W$ signal in the low pass path. The high pass filter 19 also includes an adder 27, which serves to combine substantially linearly the signals passed by the respective low pass and all pass paths. In particular accordance with the principles of the present invention the signal gains of the respective low pass and all pass channels of the filter apparatus 19 are set, as by the schematically indicated gain controls 29L and 29A, at respective values $K_L$ and $K_A$, expressible in terms of the color and white signal coefficients "*a*" and "*b*," as follows:

$$K_L=\frac{a+b}{a+3b},\text{ and } K_A=\frac{a}{a+3b}$$

It may be appreciated that with such gain settings for the respective low pass and all pass channels of high pass filter 19, the respective signals supplied thereby to adder 27 comprise: (1) a signal of the character $-(a+b)W$ (the minus sign representing the polarity reversal of the signals in inverter 23), restricted in frequency to the illustrative 0 to 1 mc. low frequency band, and (2) a wide band (illustratively 0–6 mc.) signal of the character $a$W. Combination of these signals in adder 27 results in an output signal which, in the 0 to 1 mc. band, is of the character $-b$W, and which, in the 1 to 6 mc. band is of the character $a$W.

Respective signal adders 31G, 31R and 31B are provided for separate substantially linear combining of this output signal of high pass filter 19 with the respective low frequency signal outputs of filters 15G, 15R and 15B. It will be seen that the signal combining operation performed in adders 31G, 31R and 31B results not only in the addition of a mixed highs signal $a$W to each low frequency color signal, but also in an effective cancellation of the diluting $b$W signal in the low frequency color band, so that in such band the respective adder outputs include only "pure," undiluted component color signals, $a$G, $a$R and $a$B, respectively.

It may be appreciated that while apparatus 19 has been designated as a "high pass filter" in the foregoing description, the use of the indicated gain settings for the respective low pass and all pass channels thereof results in an operation unique for a "high pass filter" whereby its output includes not only high frequency components, representing the desired mixed highs signal, but also a phase inverted low frequency component, representing a "mixed lows" signal.

It should be recognized that the novel processing apparatus of the present invention as described above is generally applicable to use with a wide variety of color signal sources. In addition to the forms of tri-color pickup tubes particularly described previously, tri-color pickup tubes of other proposed types may provide a form of "dilution" of a different character, the principles of the present invention being equally applicable to the removal thereof. For example, it has been proposed that the optical filter strips of a tri-color pickup tube be of the type selectively passing red and blue, blue and green, and green and red, rather than the indicated green-pass, red-pass and blue-pass filters. It may be appreciated that the respective magenta (i. e. red-plus-blue), cyan (i. e. blue-plus-green), and yellow (i. e. green-plus-red) signals derived from a pickup tube utilizing such optical filters may be alternatively considered as being white-minus-green, white-minus-red and white-minus-blue signals. Assuming that the target construction is such that a "white gap" is not left between the respective signal strips, the coefficients "$a$" and "$b$" for the expressions of the input signals to the processing apparatus described above may thus be generalized as $-1$ and $+1$, respectively. The appropriate gain settings for the all pass and low pass channels of filter apparatus 19, in such a case, will be $$\frac{-1}{-1+3}=-\frac{1}{2}, \text{ and } \frac{-1+1}{-1+3}=0, \text{ respectively}$$

It should be noted that where, as in this example, the signs of the coefficients "$a$" and "$b$" require a "negative" $K_A$ gain setting, a phase inversion must be effected in the all pass path of filter apparatus 19.

It may be appreciated that in the "negative" filter example given above, the pickup tube output signals are not diluted in the usual sense. That is, in terms of the color information selected by the optical filters, the output signals are assumed to be "pure"; in terms of the component color information desired, however, the signals are diluted in the sense of respectively comprising a desired component color signal subtracted from a white signal. If, however, it is assumed that the target construction is such that "white gaps" are left between the signal strips of the target, dilution in the usual sense must additionally be considered. In such a case the coefficients "$a$" and "$b$" may be respectively generalized as $-1$, and $(1+x)$, where "$x$" is a factor determined by the relative width of the white gap, etc. The gain settings, $K_A$ and $K_L$, in this case, will thus be $$\frac{-1}{-1+3(1+x)}=-\frac{1}{2+3x}$$

and $$\frac{-1+1+x}{-1+3(1+x)}=\frac{x}{2+3x}, \text{ respectively}$$

It will be seen that the negative sign of the gain setting $K_A$ again requires a phase inversion in the all pass channel of filter apparatus 19.

It may be appreciated that in both of the examples given with respect to tubes utilizing "negative" filters the processing apparatus of the invention is again serving both a mixed highs adding purpose in the high frequency band, and a dilution removal purpose in the low frequency color signal band. However, in these examples, the dilution removal includes a conversion of "magenta," "cyan" and "yellow" signals to desired forms of green, red and blue signals, respectively.

Achievement of dilution removal including a like form of signal conversion is also the result of use of processing apparatus in accordance with the present invention with tri-color pickup tubes of an additionally proposed type wherein the target is such that each signal strip is situated so as to receive light passing through two adjacent ones of a plurality of interleaved "positive" red, green and blue filters. It may be appreciated that with such a type of target structure, the respective output signals are again of the magenta, cyan and yellow, or white-minus-green, etc. type. Assuming no white gap between the optical filters, the coefficients "$a$" and "$b$" may be generalized as $$-\frac{1}{2}, \text{ and } +\frac{1}{2}, \text{ respectively}$$

or assuming the presence of such white gaps, the coefficients "$a$" and "$b$" may be generalized as $$-\frac{1}{2}, \text{ and } +\frac{1}{2}+x, \text{ respectively}$$

Values for $K_A$ and $K_L$ are thus $$-\frac{1}{2} \text{ and } 0, \text{ respectively}$$

for the first case, and $$-\frac{1}{2+6x} \text{ and } \frac{x}{1+3x}, \text{ respectively}$$

for the second case, in accordance with the formulas set forth previously. It will be thus seen that the operations performed are of a quite similar nature to those set forth above for the "negative" filter examples.

From the foregoing, the universality of application of the principles of the present invention to the removal of diluting white information from a set of simultaneous color signals may be appreciated. It will be realized that the desirable advantages of the present invention may be obtained irrespective of the causation of such dilution, i. e. whether due to the presence of white gaps between the optical filters of the target structure, the "negative" character of the optical filters utilized relative to the desired component colors, the staggered positioning of the target signal strips relative to the optical filter strips, or other target construction pecularities, or whether due to some other factor having no relation to the pickup tube target structure. The present invention, in effect, provides relatively simple means for "computing out" undesired white information diluting a set of simultaneous color signals while combining therewith the usual mixed high signal.

In Figures 2*a* and 2*b*, apparatus of the general form illustrated in Figure 1 is shown in schematic detail. The same reference numerals have been used to denote the components of the schematic that correspond to those illustrated in block form in Figure 1. While particular values of the circuit constants and particular tube types have been indicated on the drawing, it will be appreciated that these are given for the purpose of presenting a particular working example, and the present invention is not to be considered as restricted to the use of these particular values and types. It should also be noted that since low pass filters 15G, 15R, 15B and 21 are desirably identical, only one of these (15G) has been illustrated in schematic detail.

The signal processing apparatus schematically illustrated in Figures 2*a* and 2*b* includes for conventional buffer purposes a number of amplifying stages not specifically indicated in the block diagram of Figure 1. These include respective cathode follower input stages 14G, 14R and 14B for the low pass filters 15G, 15R and 15B, a cathode follower output stage 28 for the "high pass filter" 19, and respective cathode follower output stages 32G, 32R and 32B for the signal adders 31G, 31R and 31B. It may also be observed that while the adder 17 in Figure 2*a* involves a phase reversal not indicated in the discussion of Figure 1, the subsequent adder 27 also involves a phase reversal not indicated in the latter, so that the previously indicated form of the filter 19 output ($-b$W from 0–1 mc., $a$W from 1–6 mc.) is still appropriate.

In the all pass channel of the filter apparatus 19 of Figure 2*a*, as illustrated, the output of delay line 25 is directly applied, via the channel's gain control potentiometer 29A and a switch 26S, to the adder 27. From the previous discussion with respect to Figure 1, it will be appreciated that such connection is appropriate where the nature of the input signals is such that the proper value for $K_A$ is positive in sign, as with the use of the illustrative "positive" filter type target first described. It will however be appreciated that where the nature of the input signals is such that the proper value for $K_A$ is negative in sign, as in the examples of use of "negative" filters, or in the use of "positive" filters not in registry with the target's signal strips, phase inverting means are required in the all pass channel. As indicated in Figure 2*a*, such phase inversion may be effected when required by adjusting switch 26S to make an alternative connection of the adder 27 input to the output electrode of a phase inverter 26, a control electrode of which is connected to the adjustable output tap on gain control potentiometer 29A. That is, where $K_A$ is determined to be positive in sign, switch 26S is thrown to the position illustrated, causing the signals in the all pass channel to by-pass inverter 26, where $K_A$ is determined to be negative in sign, the switch 26S is thrown to the alternative position from that illustrated, connecting the phase inverter 26 in the all pass channel.

Having thus described the invention, what is claimed is:

1. In a color television system provided with a source of a plurality of simultaneous color signals, $aG+bW$, $aR+bW$ and $aB+bW$, respectively, where $W=G+R+B$, signal processing apparatus comprising in combination a plurality of low pass filters having substantially identical passbands; means for coupling said plurality of low pass filters to said source such that each of said color signals is applied to a respectively different one of said low pass filters; means additionally coupled to said source for adding said plurality of simultaneous color signals together to provide a sum signal output; filtering apparatus coupled to said adding means and including a low pass channel having a passband substantially identical to the passband of each of said low pass filters, and another channel having a broader passband than said low pass channel, means for applying said sum signal to both of said channels, and means for adding together the outputs of said low pass channel and said other channel to provide a filter output signal, said low pass channel including phase inverting means; means for setting the gain of said low pass channel substantially equal to $$\frac{a+b}{a+3b}$$

means for setting the gain of said other channel substantially equal to $$\frac{a}{a+3b}$$

and means for separately combining said filter output signal with the output of each of said plurality of low pass filters to provide a plurality of processed signal outputs.

2. In a color television system wherein a plurality of simultaneous color signals G, R and B, respectively, are desired for utilization over a low frequency portion of a video band, and a white signal W, where W substantially equals $G+R+B$, is desired for utilization over the remainder of said video band, and wherein there is provided a source of a plurality of simultaneous signals having the respective forms $aG+bW$, $aR+bW$, and $aB+bW$ over said video band, apparatus for deriving desired signals from the signals provided by said source comprising in combination a plurality of low pass filters coupled to said source for deriving therefrom a plurality of signals of respective forms $aG+bW$, $aR+bW$, and $aB+bW$ restricted in frequency to said low frequency portion of said video band, adding means additionally coupled to said source for combining the signals provided by said source to obtain a sum signal of the form $(a+3B)W$, filtering apparatus including respective parallel signal paths coupled to said adding means, one of said parallel paths having a low pass characteristic, means including a phase inverter for adjusting the gains of said parallel paths such that the combined output thereof comprises an output signal of the form $-bW$ over said low frequency video band portion and of the form $aW$ over the remainder of said video band, and means for separately combining said latter output signal with each of the frequency restricted signals derived by said plurality of low pass filters.

3. Apparatus in accordance with claim 2 wherein said one path comprises a low pass filter having substantially the same passband as said first-mentioned plurality of low pass filters, and phase inverting means, the gain of said low pass path being adjusted to be substantially equal to $$\frac{a+b}{a+3b}$$

4. Apparatus in accordance with claim 3 wherein the other of said paths comprises signal delay means having substantially the same delay as said low pass path, the gain of said other path being adjusted to be substantially equal to $$\frac{a}{a+3b}$$

5. Apparatus in accordance with claim 2 wherein the other of said paths includes phase inverting means.

6. In a color television system provided with a plurality of diluted color signals expressible as $aG+bW$, $aR+bW$ and $aB+bW$, respectively, where G, R and B are desired component color signals and W substantially equals $G+R+B$, signal processing apparatus comprising in combination a plurality of low pass filters each having a substantially identical passband and each having applied thereto a respectively different one of said diluted color signals, signal adding means also coupled to said source for summing said diluted color signals, means responsive to the output of said signal adding means for deriving therefrom a signal comprising a mixed highs component and also including a mixed lows component substantially equal to $-bW$ and having a bandwidth substantially equal to said filter passbands, and a plurality of additional signal adding means each in series with one of said low pass filters, means for applying the signal derived by said deriving means to each of the said adding means to provide a processed signal in the output of each additional signal adding means.

7. Apparatus in accordance with claim 6 wherein said means for deriving said signal having said mixed highs and mixed lows components includes a low pass channel coupled to said first-named signal adding means, and another channel also coupled to said first-named signal adding means and having a broader passband than said low pass channel, and means for combining the signals passed by said two channels, said low pass channel including signal polarity reversing means.

8. Apparatus in accordance with claim 7 wherein said other channel includes signal delay means providing a signal delay substantially corresponding to the signal delay of said low pass channel.

9. Apparatus in accordance with claim 8 wherein means are provided for adjusting the gains of said low pass channel and said other channel to be substantially equal to $$\frac{a+b}{a+3b} \text{ and } \frac{a}{a+3b}\text{, respectively}$$

10. Apparatus in accordance with claim 8 wherein said other channel also includes signal polarity reversing means.

References Cited in the file of this patent

UNITED STATES PATENTS 2,651,673 Fredendall ---------------- Sept. 8, 1953